Patented Jan. 1, 1946

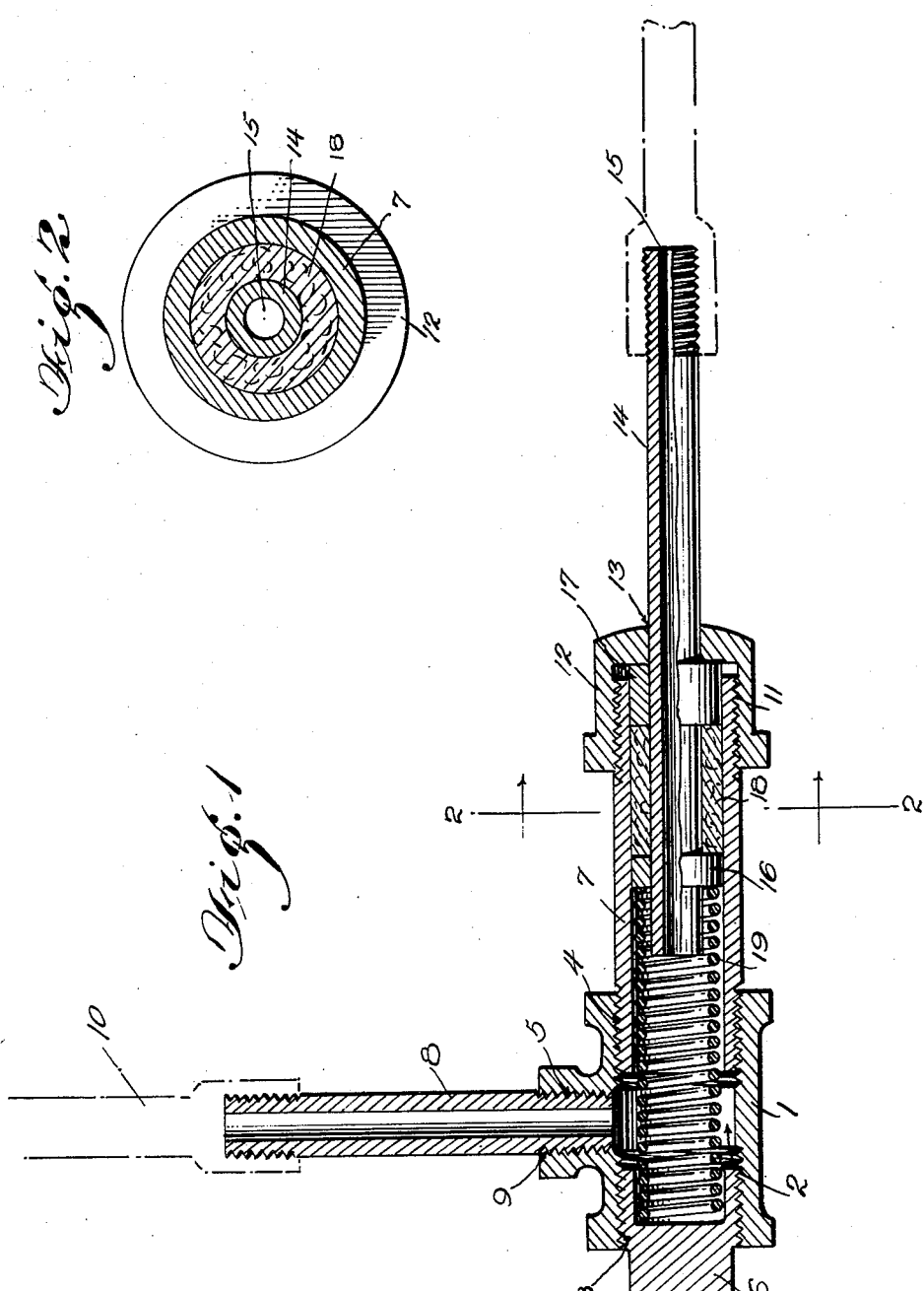

2,391,885

UNITED STATES PATENT OFFICE 2,391,885

FLEXIBLE JOINT

O'Connell H. Deshields, Philadelphia, Pa.

Application July 31, 1944, Serial No. 547,473

2 Claims. (Cl. 285—97.6)

(Granted under the act of March 3, 1883, as amended April 30, 1928; 370 O. G. 757)

The invention described herein if patented may be manufactured and used by or for the Government for governmental purposes, without the payment to me of any royalty thereon.

The present invention relates to pipe joints, and more particularly to pipe joints wherein certain of the structural members are capable of movement with respect to others. In a more limited sense, there is provided means whereby one of the structural members may have both longitudinal and rotational movement in regard to another. The construction finds special application in pressing machines or the like in that it eliminates the employment of the conventional steam hose connection.

Numerous structures have been proposed heretofore to provide a flexible joint which will afford longitudinal and rotational movement of certain of the structural members. In the most part, however, these prior joints have not proven entirely satisfactory since they have a tendency to permit the fluid passing therethrough to leak during use. Moreover, the structures have been somewhat complex in construction, and the machined parts have been difficult to repair and replace.

An object of this invention is to overcome the disadvantages of the prior art.

Another object is to provide a pipe joint wherein certain of the structural members may have movement with respect to other members.

Yet a further object of the present invention is to provide a flexible pipe joint wherein one of the members may have both longitudinal and rotational movement with respect to another of the members.

Another object of this invention is to provide a flexible joint which will not permit the leakage of fluid during use.

To accomplish the above and other important objects, the invention comprises a body portion having a tubular conduit mounted therein for both longitudinal and rotational movement. More specifically, the tubular conduit telescopes within the body portion and is provided with an annular ring adjacent the inner end thereof. Slidably mounted on the conduit and spaced from the annular ring is a washer, and suitable packing material surrounds the conduit between the ring and washer to effect a fluid tight seal. A helical spring is disposed within the body and one end thereof bears against the washer, and at the same time urge the conduit toward the end of the body. By virtue of this construction, it is apparent that the conduit may have longitudinal and rotational movement within the body portion.

In the drawing in which like numerals indicate the same or similar parts:

Figure 1 is a view in side elevation partly in section illustrating the principles of the invention.

Figure 2 is a transverse sectional view taken along the line 2—2 of Figure 1 looking in the direction of the arrows.

Referring to Figure 1, there is illustrated a T-fitting 1 having an internal bore 2 and internally threaded apertures 3, 4 and 5 respectively. The aperture 3 is closed by an externally threaded plug 6, and a short section of pipe 7 is threaded into the aperture 4. A conduit 8 having a threaded portion 9 is screwed into the aperture 5, and it will be noted that the free end of the conduit may have secured thereto a flexible hose 10. The outer end of the pipe section 7 is formed with external threads 11 and an internally threaded cap 12 formed with a centrally located opening 13 is threaded thereon.

Telescoping within the pipe section 7 is a conduit 14 having a bore 15 extending longitudinally therein. It will be noted that the outside diameter of the conduit 14 is such that the conduit may have a sliding fit within the opening 13 of the cap 12. An annular ring 16 is sweated on the conduit 14 adjacent the inner end thereof, and a washer 17 is slidably mounted on the conduit and is spaced from the annular ring 16. As best shown in Figure 1, the external diameter of the ring 16 and the washer 17 provides a tight sliding fit within the pipe section 7. By having the external diameter of the ring 16 and the washer 17 coincide substantially with the internal diameter of the pipe 7, it is apparent that the conduit 14 will be held concentric with the axis of the pipe section 7. This structure is efficacious in that the conduit will be maintained in proper position with respect to the pipe section. A suitable packing material 18 surrounds the conduit 14 and fills the orifice between the ring and washer thereby preventing the leakage of fluid during use. A helical spring 19 is mounted within the bore 2 of the fitting and the inner end thereof bears against the plug 6. The opposite end of the spring surrounds the end of the conduit 14 and engages the annular ring 16. Obviously, the spring 19 will urge the conduit 14 outwardly to maintain the washer 17 against the cap 12, and at the same time keep the packing 18 tight against the pipe section 7 and the washer to prevent the leakage of fluid.

It will be appreciated therefore that the conduit 14 is capable of both longitudinal and rotational movement with respect to the pipe section 7. The spring 19 by maintaining the packing against the washer will prevent any leakage of fluid passing through the conduit. The section may be readily employed with conventional piping and used in any place where a flexible joint is desired. The elements may have freedom of movement without any danger of leakage, and the joint does not require frequent repacking to maintain the fluid tight.

What I claim and desire to secure by Letters Patent is:

1. A pipe joint comprising a T-fitting having threaded apertures, a closure threaded at one end of the cross portion of said T-fitting, a pipe section having one end thereof threaded at the other end of the cross portion of said T-fitting, a closure having a centrally located aperture therein threaded on the other end of said pipe section, a conduit extending through the aperture in said last-mentioned closure and into said pipe section, said conduit having an annular ring attached thereto adjacent the end thereof which extends into said pipe section, a washer slidably mounted on said conduit within said pipe section, a packing material disposed about said conduit between said ring and said washer, and spring means disposed within the cross portion of said T-fitting, one end thereof engaging said annular ring and the other end engaging said first-mentioned closure, and the staff portion of said T-fitting being adapted to receive a conduit whereby communication is established between said conduit and the ring-carrying conduit.

2. A pipe joint comprising a T-fitting having threaded apertures, a closure threaded at one end of the cross portion of said T-fitting, a pipe section having one end thereof threaded at the other end of the cross portion of said T-fitting, a closure having a centrally located aperture therein threaded on the other end of said pipe section, a conduit extending through the aperture in said last-mentioned closure and into said pipe section, said conduit having an annular ring attached thereto adjacent the end thereof which extends into said pipe section, a washer slidably mounted on said conduit, a packing material disposed about said conduit between said ring and said washer, and a helical spring, normally under tension, disposed within the cross portion of said T-fitting, one end thereof engaging said annular ring and the other end engaging said first-mentioned closure, and the staff portion of said T-fitting being adapted to receive a conduit whereby communication is established between said conduit and the ring-carrying conduit.

O'CONNELL H. DESHIELDS.